United States Patent
Francis et al.

(10) Patent No.: US 6,837,508 B2
(45) Date of Patent: Jan. 4, 2005

(54) COSMETIC SHROUD FOR MOTORCYCLE FORKS AND METHOD OF USING THE SAME

(75) Inventors: Kenneth A. Francis, Kirkwood, MO (US); William G. Allemann, St. Louis, MO (US)

(73) Assignee: Midwest Motorcycle Supply Distributors Corp., Arnold, MO (US)

( * ) Notice: Subject to any disclaimer, the term of this patent is extended or adjusted under 35 U.S.C. 154(b) by 0 days.

(21) Appl. No.: 10/419,569

(22) Filed: Apr. 21, 2003

(65) Prior Publication Data

US 2004/0207171 A1 Oct. 21, 2004

(51) Int. Cl.⁷ .............................................. B62K 25/08
(52) U.S. Cl. ................ 280/276; 188/322.12; 280/304.3
(58) Field of Search .............................. 280/304.3, 276, 280/277, 283, 286; 180/219; 188/322.12; D12/126

(56) References Cited

U.S. PATENT DOCUMENTS

| | | | | | |
|---|---|---|---|---|---|
| 4,114,460 A | * | 9/1978 | Oto | ............................ | 277/636 |
| 4,138,132 A | * | 2/1979 | Doyle | ...................... | 280/304.3 |
| D313,774 S | * | 1/1991 | Hauer | ......................... | D12/126 |
| 5,251,729 A | * | 10/1993 | Nehl et al. | ................ | 188/266.1 |
| 5,924,715 A | * | 7/1999 | Norem | ......................... | 280/276 |
| 5,947,498 A | * | 9/1999 | Rajaee | ......................... | 280/276 |
| D444,104 S | * | 6/2001 | Baker | ......................... | D12/126 |
| 6,659,489 B2 | * | 12/2003 | Masui et al. | .............. | 280/304.3 |
| 2002/0053494 A1 | * | 5/2002 | Nakamura | .............. | 188/322.12 |

FOREIGN PATENT DOCUMENTS

JP             08067280 A    *  3/1996    ............ B62J/23/00

* cited by examiner

Primary Examiner—Kevin Hurley
(74) Attorney, Agent, or Firm—Thompson Coburn LLP

(57) ABSTRACT

A shroud is disclosed that disguises the particular type of motorcycle fork blade to which it's attached, thereby making the fork blade appear to be that of a different type. As disclosed, a motorcycle fork comprises a fork blade and a shroud. The fork blade comprises an upper support member telescopically received within a lower support member. The shroud is fixedly attached to the upper support member and the lower support member is telescopically received in the lower portion of the shroud. Thus, the invention provides a method of disguising motorcycle forks by attaching the shroud to the motorcycle fork. A method of assembling the shroud to a fork assembly is also disclosed.

23 Claims, 3 Drawing Sheets

COSMETIC SHROUD FOR MOTORCYCLE FORKS AND METHOD OF USING THE SAME

BACKGROUND OF THE INVENTION

The present invention relates to front suspension forks of motorcycles. More particularly, the present invention relates to a cosmetic shroud, which may be installed on a motorcycle front suspension fork to alter the appearance of the motorcycle fork for aesthetic purposes.

In general, a motorcycle suspension fork comprises a pair of generally parallel fork blades and an attachment or securing member, which connects the fork blades to one another at or near their respective upper ends. Lower ends of the fork blades connect to and support an axle for a front wheel of the motorcycle. The attachment member pivotally connects the fork blades to the frame of the motorcycle and pivots relative to the frame to permit steering of the front wheel. Typically, each of the fork blades includes first and second support members that are telescopically engaged with one another for reciprocating movement relative to one another along an axis. Such fork blades also typically include one or more springs, which bias the support members toward a particular orientation relative to one another, and dampers which minimize oscillation. The reciprocating movement of the support members of each fork blade, together with their associated springs and dampers, provides suspension, which allows the fork to absorb shock and thereby provide a smooth ride as the motorcycle travels.

In general, there are two configurations of telescoping fork blades for motorcycles in wide usage. In the first configuration, the upper support member has an upper portion that is rigidly attached to the securing member of the fork and a lower end margin that is telescopically received within an upper end margin of the lower support member, and the lower portion of the lower support member is connected to the axle of the front wheel. In the second configuration, the telescoping relationship of the upper and lower support members is opposite the first configuration in that an upper end margin of the lower support member is telescopically received within a lower end margin of the upper support member.

The first fork blade configuration (wherein the lower end margin of the upper support member is telescopically received within an upper end margin of the lower support member) has advantages in that it tends to be less expensive and easier to produce and assemble than the second fork blade configuration (wherein the upper end margin of the lower support member is telescopically received within the lower end margin of the upper support member). Generally speaking, the second fork blade configuration tends to be associated with superior or high performance forks.

Motorcycle enthusiasts tend to prefer superior or high performance motorcycles and parts, so generally speaking, the second fork blade configuration tends to be the preferred configuration. However, not all motorcycle enthusiasts are not willing or able to pay the higher price typically attached to premium components such as these high performance motorcycle forks, yet many motorcycle enthusiasts would still prefer to at least give the appearance of having premium components such as high performance forks with the second fork blade configuration, is simply like the look of a fork blade wherein the upper support member is larger in diameter than the lower support member. Thus, there is a need for a manner of providing the "look" of forks having the second fork blade configuration, yet having the structure and function of the first fork blade configuration, which tends to be less expensive.

SUMMARY OF THE INVENTION

The present invention pertains to a cosmetic shroud that disguises a portion of a fork blade, thereby giving the fork blade the appearance of having a different structural configuration.

In one aspect of the invention, a motorcycle fork is adapted to be pivotally attached to a motorcycle frame and comprises a fork blade and a shroud. The fork blade has an upper support member and a lower support member and each of the upper and lower support members has upper and lower end margins. The lower end margin of the lower support member is adapted to be secured to a wheel axle and the lower end margin of the upper support member is telescopically received within the upper end margin of the lower support member. This connection is such that the upper support member is movable in a reciprocating manner along an axis relative to the lower support member but is also such that bending moment perpendicular the axis is transmittable from the lower support member to the upper support member. In other words, the upper support member is held in alignment with the lower support member by nature of the telescopic connection therebetween. The shroud is attached to the fork blade and has upper and lower portions. The upper portion of the shroud is fixedly attached to the upper end margin of the upper support member and the upper end margin of the lower support member is telescopically received in the lower portion of the shroud.

In another aspect of the invention, a method comprises the steps of providing a motorcycle fork, providing a shroud, and disguising the motorcycle fork by attaching the shroud to the motorcycle fork. The step of providing of the motorcycle fork is performed in a manner such that the motorcycle fork comprises a fork blade having first and second support members. The first support member is telescopically received in the second support member in a manner such that the first support member is slidably engaged with the second support member. The step of disguising the motorcycle fork by attaching the shroud is performed in a manner such that the shroud conceals the first support member and provides a false appearance that the second support member is slidably engaged with the shroud.

In yet another aspect of the invention, a method comprises the steps of providing a motorcycle fork blade assembly, providing first and second motorcycle fork triple trees, providing a shroud, and assembling the shroud and the first and second triple trees to the fork blade assembly. The step of providing of the motorcycle fork blade assembly is performed in a manner such that the fork blade assembly comprises upper and lower support members, with each of the upper and lower support members having upper and lower end margins. The lower end margin of the upper support member is telescopically received within the upper end margin of the lower support member in manner such that the upper support member is movable in a reciprocating manner along an axis relative to the lower support member. The step of providing the first and second motorcycle fork triple trees is performed in manner such that the second triple tree has an engagement portion that engages the upper support member. The step of providing of the shroud is performed in a manner such that the shroud has an internal cavity and has at least first and second openings into the internal cavity. The step of assembling of the shroud and the first and second triple trees to the fork blade assembly is performed by inserting the upper end margin of the upper support member of the fork blade assembly into the internal cavity of the shroud. This is done by passing said upper end margin through the first opening of the shroud. The engagement portion of the second triple tree is inserted into the internal cavity of the shroud by passing the engagement portion through the second opening of the shroud. Thereafter, the first triple tree is fixedly attached to the upper support member and the second triple tree is fixedly attached to the upper support member with the engagement portion thereof being engaged with the upper support member within the internal cavity of the shroud.

While the principal advantages and features of the invention have been described above, a more complete and thorough understanding of the invention may be attained by referring to the drawings and the detailed description of the preferred embodiments which follow.

BRIEF DESCRIPTION OF THE DRAWINGS

Reference characters in the written specification indicate corresponding parts throughout the several views of the drawings.

DETAILED DESCRIPTION OF THE PREFERRED EMBODIMENTS

Figure 1:
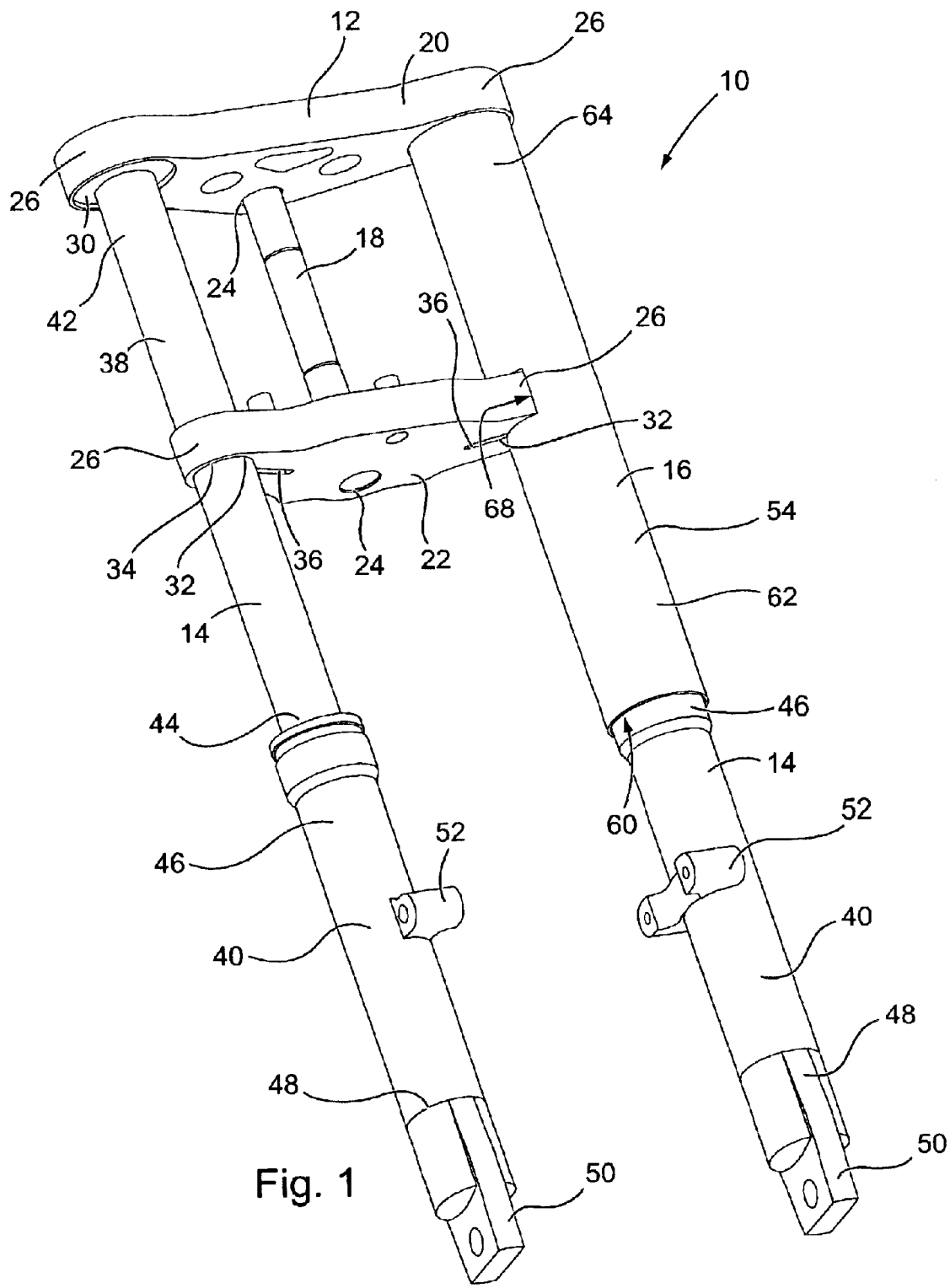
FIG. 1 is a perspective view of a motorcycle suspension fork in accordance with the invention having a cosmetic shroud covering a portion of one of its fork blades.
Figure 2:
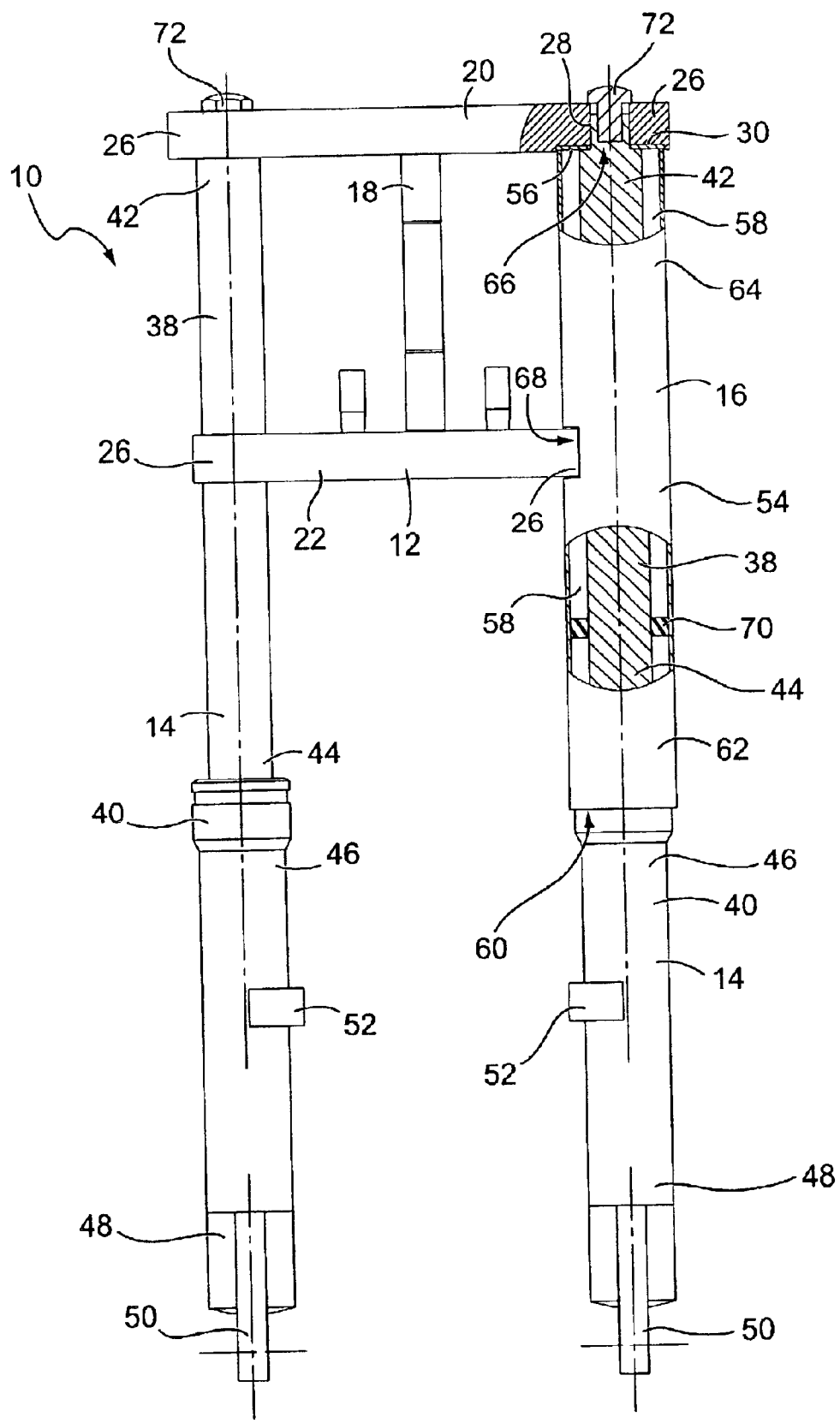
FIG. 2 is a front elevational view of the motorcycle suspension fork shown in FIG. 1 having detailed portions thereof shown in partial cross-section.

A preferred embodiment of a motorcycle fork in accordance with the invention is shown in FIGS. 1 and 2, and is generally indicated by the numeral 10. In general, the fork 10 comprises a frame attachment member 12, a pair of fork blades 14, and a pair of shrouds 16 (only one shown). For purposes of describing the invention, one of the fork blades 14 is shown without a shroud 16. However, it should be appreciated that in practicing the invention, this fork blade would be partially concealed by the second shroud.

The frame attachment member 12 of the fork 10 preferably comprises a hinge-pin 18 and a pair of triple trees 20,22. The triple trees 20,22 and the hinge-pin 18 are preferably formed of metal. The configuration and use of triple trees in conjunction with motorcycle forks are widely known in the motorcycle industry and the triple trees 20,22 of the preferred embodiment are generally similar to those of the prior art. The triple trees 20,22 each include a hinge-pin opening 24 and a pair of attachment portions 26 that are symmetrically spaced from the hinge-pin opening. Each attachment portion 26 of the upper triple tree 20 comprises a cylindrical through-hole 28 for attachment to one of the fork blades 14 (shown in FIG. 2). Unlike typical prior art triple trees, each of the through-holes 28 of the upper triple tree 20 preferably includes a counterbore 30. Each of the attachment portions 26 of the lower triple tree 22 includes a slotted through-hole 32, with each of the slotted through-holes 32 comprising a generally cylindrical portion 34 and a slotted portion 36 extending radially therefrom.

Each of the fork blades 14 generally comprises an upper support member 38 and a lower support member 40 which are preferably formed of metal. The upper support member 38 of each of the fork blades 14 is generally shaped as a solid cylindrical rod and has axially opposite upper and lower end margins 42,44. The lower support member 40 of each of the fork blades 14 is an elongate member and also has an upper end margin 46 opposite a lower end margin 48. The upper end margin 46 of the lower support member 40 has a socket that is recessed therein and is adapted for receiving the lower end margin 44 of the upper support member 38 in a telescoping manner as shown. The lower end margin 48 of the lower support member 40 comprises a lug 50 that is adapted to be secured to the axle of a front wheel of a motorcycle. The lower support member 40 further includes a brake mechanism attachment member 52 that is adapted to support the brake mechanism (not shown) of the motorcycle from the lower support member. Although not visible in the drawings, each of the fork blades 14 also comprises one or more helical compression springs that act to bias the upper support member 38 in a particular direction relative to the lower support member 40. In the preferred embodiment, these helical compression springs are located within the recess of each of the lower support members 40. It is important to appreciate that the fork blades 14 are conventional prior art suspension fork blades and are fully capable of attaching the front wheel of a motorcycle to the remainder of the motorcycle and of being used in a conventional manner without the shrouds 16 hereinafter described. Thus, a detailed discussion of the configuration and operation of the fork blades 14 in this specification is unnecessary.

Figure 3:
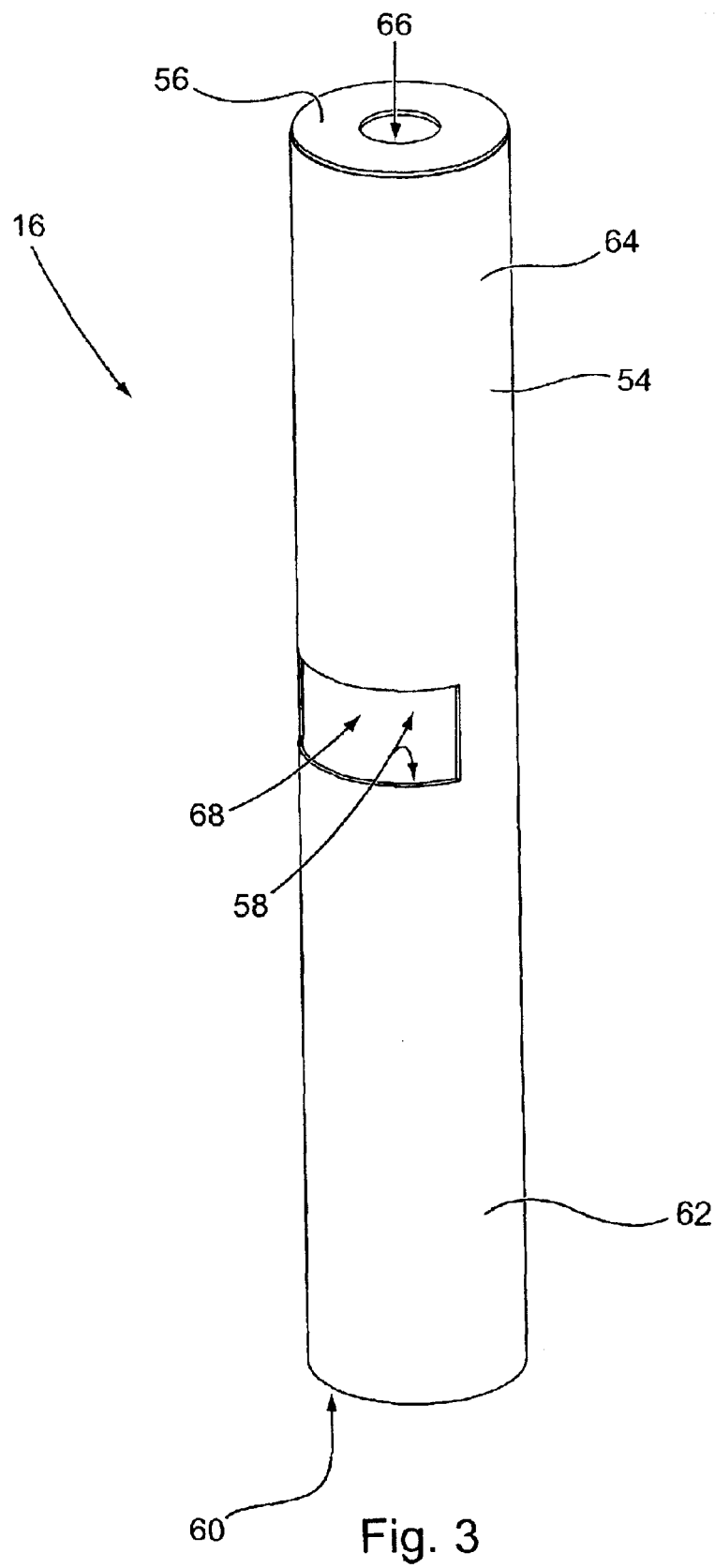
FIG. 3 is a perspective view of the cosmetic shroud utilized on the suspension fork shown in FIGS. 1 and 2.

The shrouds 16 are preferably formed of metal and preferably identical to one another. For clarity, one of the shrouds 16 is shown by itself in FIG. 3. Each shroud 16 preferably comprises a thin cylindrical wall 54 and an end cap 56. The cylindrical wall defines an internal cavity 58 with an opening 60 at the base of the lower portion 62 of the shroud 16, which permits access to the internal cavity 58 from below. The end cap 56 is generally "washer-shaped," with a diameter and thickness substantially equal to that of the cylindrical wall 54, and is preferably welded to the cylindrical wall in a manner such that it partially closes the top of the upper portion 64 of the shroud 16. Alternatively, the end cap 56 and cylindrical wall 54 may be of a unitary construction. An opening 66 extends through the end cap 56 and communicates with the internal cavity 58 of the shroud 16. A generally rectangular slot 68 extends through the cylindrical wall 54 and also communicates with the internal cavity 58 of the shroud 16.

Having described the various main components of the fork 10, the method of assembling the various components will now be described. It should be appreciated that the purpose of shrouds 16 is to conceal the nature of the fork blades 14 and that, assuming the fork 10 was already being used on a motorcycle without the shrouds, the fork blades and the triple trees 20,22 must first be disassembled from one another and from the motorcycle by reversing the steps of their original assembly, though the upper and lower support members 38,40 of each of the fork blades 14 can remain attached to each other.

Once the fork blades 14 and the triple trees 20,22 have been disassembled from one another and from the motorcycle, the counterbores 30 of the attachment portions 26 of the upper triple tree 20 can be formed therein by a machining process or other means. An O-ring 70 (preferably of an elastomeric material) is then slid onto the upper support member 38 of each of the fork blades 14 by passing the upper end margin 42 of the upper support member through the O-ring 70. Preferably, the appropriate attachment portion 26 of the lower triple tree 22 is then inserted into the internal cavity 58 of one of the shrouds 16 by passing it through the rectangular slot 68 of the cylindrical wall 54 of the shroud. The upper support member 38 of one of the fork blades 14 is then inserted through the opening 60 at the base of the cylindrical wall 54 of the shroud and is slid upwardly into the internal cavity 58 of the shroud. During this procedure, the upper end margin 42 of the upper support member 38 of the fork blade 14 is inserted through the cylindrical portion 34 of attachment portion 26 of the lower triple tree 22. Once the fork blade 14 is fully inserted into the shroud 16, the end cap 56 of the shroud will engage the upper support member 38 of the fork blade 14 and thereby prevent further upward movement of the fork blade relative to the shroud. This procedure is then repeated for the other fork blade 14 and the other shroud 16.

Having performed the above-mentioned steps, the fork blades 14 will be connected to each other via the lower triple tree 22, and the upper triple tree 20 is then attached to the assembly. This is preferably done by inserting the top of the shrouds 16 into the counterbores 30 of the upper triple tree 20 and by inserting bolts 72 downwardly through the through-holes 28 of the upper triple tree. Each of the bolts 72 is configured to threadingly engage the upper support member 38 of the respective fork blade 14 through the opening 66 in the end cap 56 of the respective shroud 16 and to thereby clamp the end cap of the shroud between the upper support member and the upper triple tree. The attachment portions 26 of the lower triple tree 22 are also locked securely to the upper support members 20 by tightening bolts (not shown) that thereby reduce the width of the slotted portions 36 of the slotted through-holes 32 so as to create a clamping action.

The fork 10 assembly can be reattached to the motorcycle by passing the hinge pin 18 of the frame attachment member 12 through the hinge pin openings 24 of the triple trees 20,22 and through the corresponding portion (not shown) of the motorcycle frame in a conventional manner. Finally, if removed during any portion of the assembly procedure, the front wheel of the motorcycle can be reattached to the lugs 50 of the fork 10.

It should be appreciated that the above-described assembly steps could be performed in a different order. For example, the upper support member 38 of the fork blades 14 can be slid upwardly partially into the internal cavity 58 of the shroud 16 prior to the insertion of the attachment portion 26 of the lower triple tree 22 into the internal cavity. As an additional example, the assembly of one fork blade 14 to the triple trees 20,22 could be entirely or only partially completed prior to the assembly of the other fork blade.

As assembled, the shrouds 16 conceal the upper support members 38 of the fork blades 14 and provide the false appearance of being structural members themselves. To facilitate this false appearance, the rectangular slot 68 through the cylindrical wall 54 of each shroud 16 is preferably dimensioned only large enough to allow the attachment portion 26 of the lower triple tree 22 to extend therethrough. Additionally, as shown in the drawing figures, the lower portions 62 of the shrouds overlap the upper end margins 46 of the lower support members 40 slightly such that the lower support members are each telescopically received in the internal cavity 58 of one of the shrouds through the opening 60 at the base of the respective shroud. Preferably, the diameter of each of the O-rings 70 is slightly larger than the inner diameter of the cylindrical wall 54 of the shroud 16 in a manner so that it is radially compressed between the upper support member 38 and the cylindrical wall and thereby maintains the lower portion 62 of the shroud in alignment with the upper support member. Additionally, the diameter of the cylindrical wall 54 of each shroud 16 is configured to be only slightly larger than the diameter of the upper end margin 46 of the lower support member 40 to provide the false appearance of the lower support member being slideably engaged with the shroud. However, it should be appreciated that the lower support members 40 remain slideably engaged with the upper support members 38 and that it is the upper support members 38 that actually transmit loads between the motorcycle and its front wheel in a manner independent of the shrouds 16.

In view of the foregoing, it should be apparent and appreciated the shrouds provide an economical means for disguising the type of front suspension on a motorcycle. Additionally, it should be appreciated that the shrouds do not interfere in any way with the operation of the structural components of the suspension system.

In view of the above, it can be seen that the present invention overcomes problems associated with the prior art and achieves other advantageous results. As various changes could be made without departing from the scope of the invention, it is intended that all matter contained in the above description and shown in the accompanying drawings be interpreted as illustrative and not limiting. It should be understood that other configurations of the present invention could be constructed, and different uses could be made, without departing from the scope of the invention as set forth in the following claims.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements.

What is claimed is:

1. A motorcycle comprising:
    a motorcycle frame;
    a fork blade pivotally attached to the motorcycle frame, the fork blade having an upper support member and a lower support member, each of the upper and lower support members having upper and lower end margins, the lower end margin of the lower support member being adapted to be secured to a wheel axle, the lower end margin of the upper support member being telescopically received within the upper end margin of the lower support member in manner so that the upper support member is movable in a reciprocating manner along an axis relative to the lower support member and so that bending moment perpendicular to the axis is transmittable from the lower support member to the upper support member; and
    a shroud attached to the fork blade, the shroud having upper and lower portions, the upper portion of the shroud being fixedly attached to the upper end margin of the upper support member, the upper end margin of the lower support member being telescopically received in the lower portion of the shroud.

2. A motorcycle in accordance with claim 1 wherein the motorcycle is devoid of any helical spring being positioned both above the lower support member and around the upper support member.

3. A motorcycle in accordance with claim 1 wherein the shroud has an interior surface and the upper support member has an exterior surface, the motorcycle further comprising a space defined by the interior surface of the shroud, the exterior surface of the upper support member, and the upper end margin of the lower support member, the space being devoid of any spring.

4. A motorcycle fork adapted to be pivotally attached to a motorcycle frame, the fork comprising:

a fork blade having an upper support member and a lower support member, each of the upper and lower support members having upper and lower end margins, the lower end margin of the lower support member being adapted to be secured to a wheel axle, the lower end margin of the upper support member being telescopically received within the upper end margin of the lower support member in manner so that the upper support member is movable in a reciprocating manner along an axis relative to the lower support member and so that bending moment perpendicular to the axis is transmittable from the lower support member to the upper support member;

a shroud attached to the fork blade, the shroud having upper and lower portions, the upper portion of the shroud being fixedly attached to the upper end margin of the upper support member, the upper end margin of the lower support member being telescopically received in the lower portion of the shroud; and first and second triple trees which are adapted to pivotally attach the fork to the frame, the first triple tree being fixedly attached to the upper end margin of the upper support member, the second triple tree being fixedly attached to the upper support member.

5. A motorcycle fork in accordance with claim 4 wherein the shroud has an internal cavity and at least first and second openings into the internal cavity, the upper end margin of the lower support member being telescopically received in the lower portion of the shroud through the first opening, the second triple tree extending through the second opening of the shroud and being fixedly attached to the upper support member within the internal cavity of the shroud.

6. A motorcycle fork in accordance with claim 5 wherein the upper portion of the shroud is clamped between the first triple tree and the upper support member in a manner so that the shroud is fixedly attached to the first triple tree.

7. A motorcycle fork in accordance with claim 5 wherein the shroud comprises a cylindrical wall, the first opening of the shroud being at one end of the cylindrical wall and the second opening being through the cylindrical wall.

8. A motorcycle fork adapted to be pivotally attached to a motorcycle frame, the fork comprising:

a fork blade having an upper support member and a lower support member, each of the upper and lower support members having upper and lower end margins, the lower end margin of the lower support member being adapted to be secured to a wheel axle, the lower end margin of the upper support member being telescopically received within the upper end margin of the lower support member in manner so that the upper support member is movable in a reciprocating manner along an axis relative to the lower support member and so that bending moment perpendicular to the axis is transmittable from the lower support member to the upper support member, the upper support member having an exterior surface;

a shroud attached to the fork blade, the shroud having an interior surface and upper and lower portions, the upper portion of the shroud being fixedly attached to the upper end margin of the upper support member, the upper end margin of the lower support member being telescopically received in the lower portion of the shroud; and a spacer positioned between the exterior surface of the upper support member and the interior surface of the shroud in a manner so that the spacer maintains spacing between the exterior surface of the upper support member and the interior surface of the shroud.

9. A motorcycle fork in accordance with claim 8 wherein the spacer is annular and encircles the upper support member.

10. A motorcycle fork in accordance with claim 8 wherein the spacer is comprised solely of an elastomeric material.

11. A motorcycle fork in accordance with claim 8 wherein the spacer remains stationary relative to the upper support member and the shroud when the lower support member reciprocates relative to the upper support member.

12. A method comprising:

providing a motorcycle, the motorcycle having a frame and a motorcycle fork, the motorcycle fork being pivotally attached to the frame and comprising a fork blade having first and second support members, the first support member being telescopically received in the second support member in a manner such that the first support member is slidably engaged with the second support member;

providing a shroud; and disguising the motorcycle fork by attaching the shroud to the motorcycle fork in a manner such that the shroud conceals the first support member and provides a false appearance that the second support member is slidably engaged with the shroud.

13. A method in accordance with claim 12 wherein the step of disguising the motorcycle fork by attaching the shroud to the motorcycle fork comprises telescopically inserting the second support member within a portion of the shroud.

14. A method comprising:

providing a motorcycle fork, the motorcycle fork comprising a fork blade having first and second support members, the first support member being telescopically received in the second support member in a manner such that the first support member is slidably engaged with the second support member;

providing a shroud;

providing a motorcycle triple tree;

disguising the motorcycle fork by attaching the shroud to the motorcycle fork in a manner such that the shroud conceals the first support member and provides a false appearance that the second support member is slidably engaged with the shroud; and engaging the triple tree with the shroud in a manner such that the triple tree is fixedly attached to the shroud.

15. A method in accordance with claim 14 wherein the step of engaging the triple tree with the shroud in a manner such that the triple tree is fixedly attached to the shroud comprises clamping the shroud between the first support member and the triple tree.

16. A method comprising:

providing a motorcycle fork, the motorcycle fork comprising a fork blade having first and second support members, the first support member being telescopically received in the second support member in a manner such that the first support member is slidably engaged with the second support member;

providing a shroud;

disguising the motorcycle fork by attaching the shroud to the motorcycle fork in a manner such that the shroud conceals the first support member and provides a false appearance that the second support member is slidably engaged with the shroud; and providing first and second motorcycle triple trees;

fixedly attaching the first triple tree to the first support member; and fixedly attaching the second triple tree to the first support member.

17. A method in accordance with claim 16 wherein the step of fixedly attaching the second triple tree to the first support member includes positioning a portion of the second triple tree within an internal cavity of the shroud.

18. A method comprising:

providing a motorcycle fork, the motorcycle fork comprising a fork blade having first and second support members, the first support member being telescopically received in the second support member in a manner such that the first support member is slidably engaged with the second support member;

providing a shroud;

disguising the motorcycle fork by attaching the shroud to the motorcycle fork in a manner such that the shroud conceals the first support member and provides a false appearance that the second support member is slidably engaged with the shroud, the attaching of the shroud to the motorcycle fork comprising telescopically inserting the second support member within a portion of the shroud; and providing first and second motorcycle triple trees;

fixedly attaching the first triple tree to the first support member; and fixedly attaching the second triple tree to the first support member.

19. A method comprising:

providing a motorcycle fork blade assembly comprising upper and lower support members, each of the upper and lower support members having upper and lower end margins, the lower end margin of the upper support member being telescopically received within the upper end margin of the lower support member in manner such that the upper support member is movable in a reciprocating manner along an axis relative to the lower support member;

providing first and second motorcycle fork triple trees, the second triple tree having an engagement portion that is adapted to engage the upper support member;

providing a shroud, the shroud having an internal cavity and having at least first and second openings into the internal cavity;

assembling the shroud and the first and second triple trees to the fork blade assembly by inserting the upper end margin of the upper support member of the fork blade assembly into the internal cavity of the shroud by passing said upper end margin through the first opening of the shroud, inserting the engagement portion of the second triple tree into the internal cavity of the shroud by passing the engagement portion through the second opening of the shroud, and thereafter fixedly attaching the first triple tree to the upper support member and fixedly attaching the second triple tree to the upper support member with the engagement portion thereof being engaged with the upper support member within the internal cavity of the shroud.

20. A method in accordance with claim 19 wherein the step of providing the first and second motorcycle fork triple trees occurs in a manner such that the engagement portion of the second triple tree includes a closed perimeter opening that extends through the second triple tree and wherein the step of assembling the shroud and the first and second triple trees to the fork blade assembly comprises inserting the upper end margin of the upper support member of the fork blade assembly through the closed perimeter opening within the internal cavity of the shroud.

21. A method in accordance with claim 19 further comprising fixedly engaging the first triple tree with the shroud.

22. A method in accordance with claim 21 wherein the step of fixedly engaging the first triple tree with the shroud comprises clamping the shroud between the first support member and the first triple tree.

23. A method in accordance with claim 19 wherein the method further comprises providing an annular spacer and wherein the step of assembling the shroud and the first and second triple trees to the fork blade assembly further comprises positioning the annular spacer between the upper support member and the shroud within the internal cavity of the shroud.

* * * * *